United States Patent [19]

Dawson, Jr.

[11] Patent Number: 5,110,021
[45] Date of Patent: May 5, 1992

[54] COMBINATION PIPE RACK AND TOOL LOCKER FOR A TRUCK BED

[76] Inventor: Fredric O. Dawson, Jr., 1588 McKendrie, San Jose, Calif. 95126

[21] Appl. No.: 657,173

[22] Filed: Feb. 19, 1991

Related U.S. Application Data

[63] Continuation-in-part of Ser. No. 406,441, Sep. 13, 1989, abandoned.

[51] Int. Cl.$^5$ .................... B60P 3/00; B60P 7/00
[52] U.S. Cl. ................ 224/42.01; 224/42.45 R; 296/3; 296/10; 296/100
[58] Field of Search .......... 224/42.01, 42.45 R, 224/320, 42.42, 309; 296/100, 3, 10, 32

[56] References Cited

U.S. PATENT DOCUMENTS

| | | | |
|---|---|---|---|
| 2,551,239 | 5/1951 | Bond | 296/100 |
| 2,570,802 | 10/1951 | Hatteburg | 296/3 |
| 2,856,225 | 10/1958 | Selzer | 296/32 |
| 2,901,286 | 8/1959 | Harris | 224/309 |
| 3,037,807 | 6/1962 | Hicks | 296/10 |
| 3,069,199 | 12/1962 | Reardon et al. | 296/100 |
| 3,420,570 | 1/1969 | Kunz | 296/100 |
| 3,595,452 | 7/1971 | Anderson | 224/320 |
| 3,841,690 | 10/1974 | Piercy | 296/10 |
| 4,138,046 | 2/1979 | DeFreeze | 224/42.42 |
| 4,444,427 | 4/1984 | Martin | 224/42.42 |
| 4,531,775 | 7/1985 | Beals | 296/10 |
| 4,739,528 | 4/1988 | Allen | 296/100 |

Primary Examiner—Linda J. Sholl
Attorney, Agent, or Firm—Robert Samuel Smith

[57] ABSTRACT

A combination rack for hauling pipe, locker for storing tools and extended sidewalls for hauling bulky material on the back of a pickup truck comprising two doors, each hinged respectively to the top edges of opposing sidewalls of the truckbed and which close over the truckbed to form a lockable enclosure or may be oriented to an upright position and fixed by a pair of rack members extending across the truckbed on which may be carried long lengths of pipe, lumber, etc. In one embodiment, the installed rack members are raised above the roof of the cab so that pipe can extend over the roof instead of out of the tailgate. The racks may be easily removed for storage or they may be folded against the underside of the truck when it is desired to close and lock the doors. Spring loaded lift assists facilitate opening the doors and may be locked to add additional support when the doors are open. A gutter channel drain between meeting edges of the closed doors prevents entry of rain water into the truckbed when the doors are closed. The door hinges are equipped with stops that prevent unauthorized removal of the door hinge pins when the doors are closed.

17 Claims, 5 Drawing Sheets

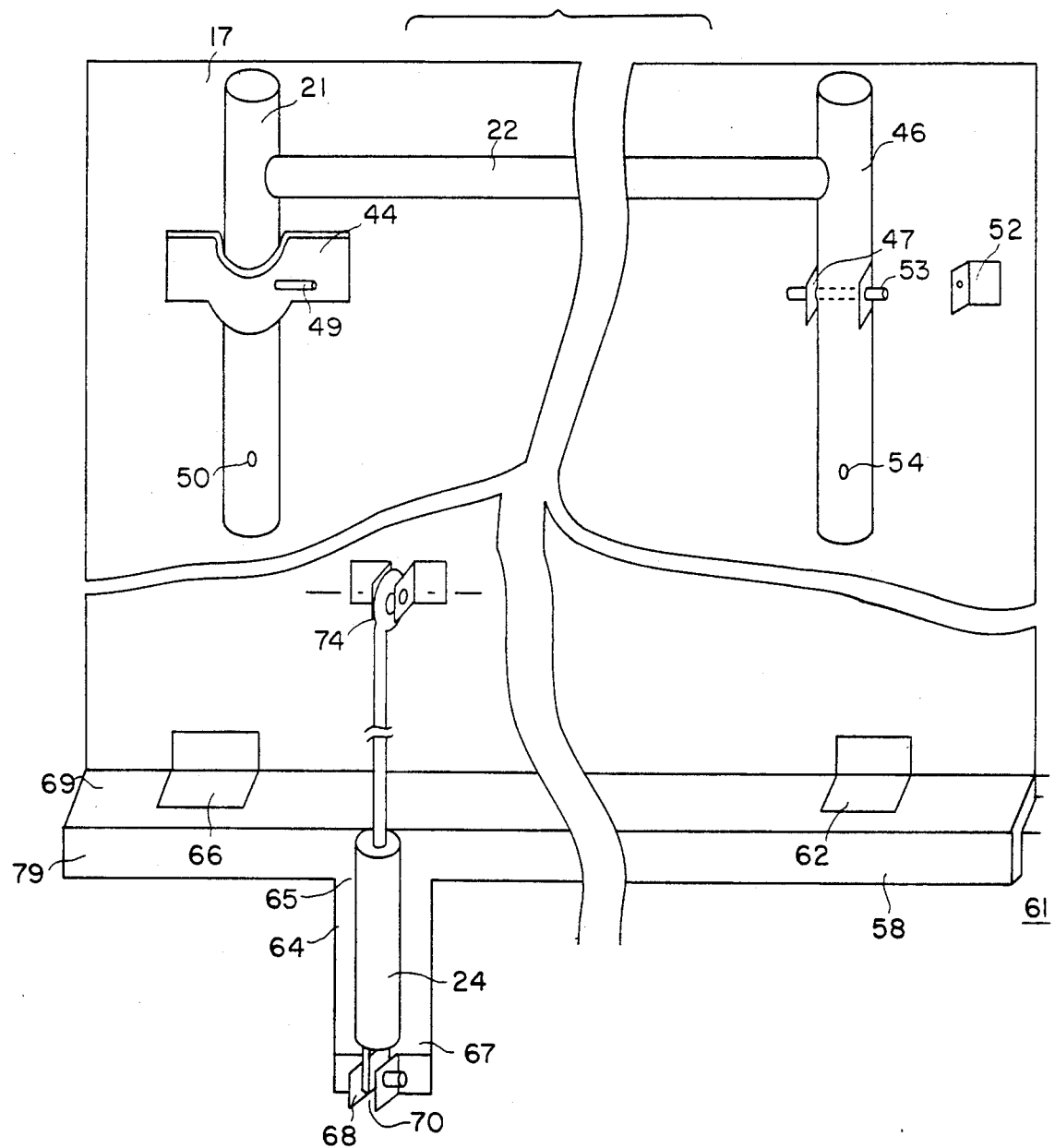

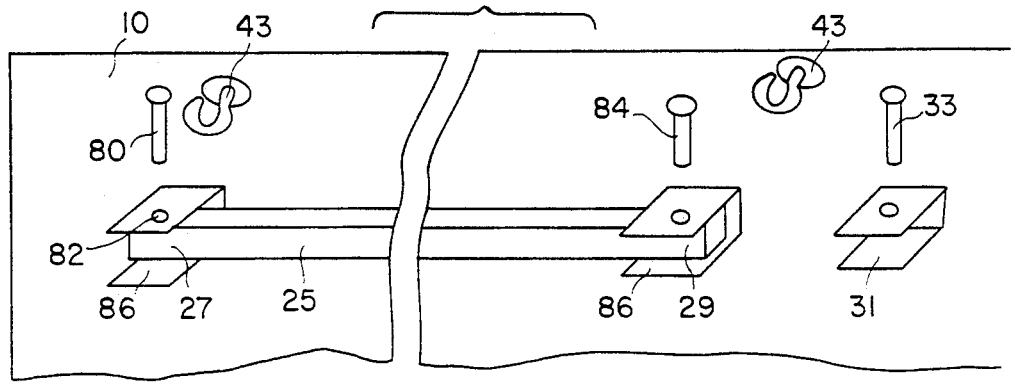
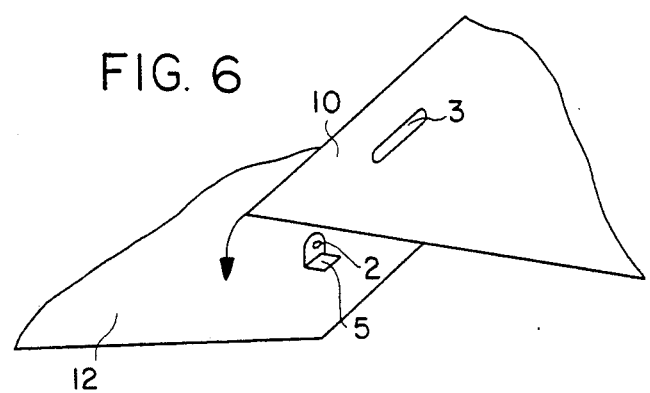
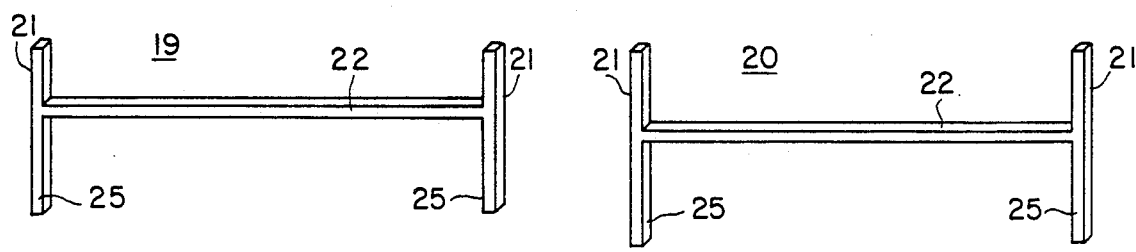

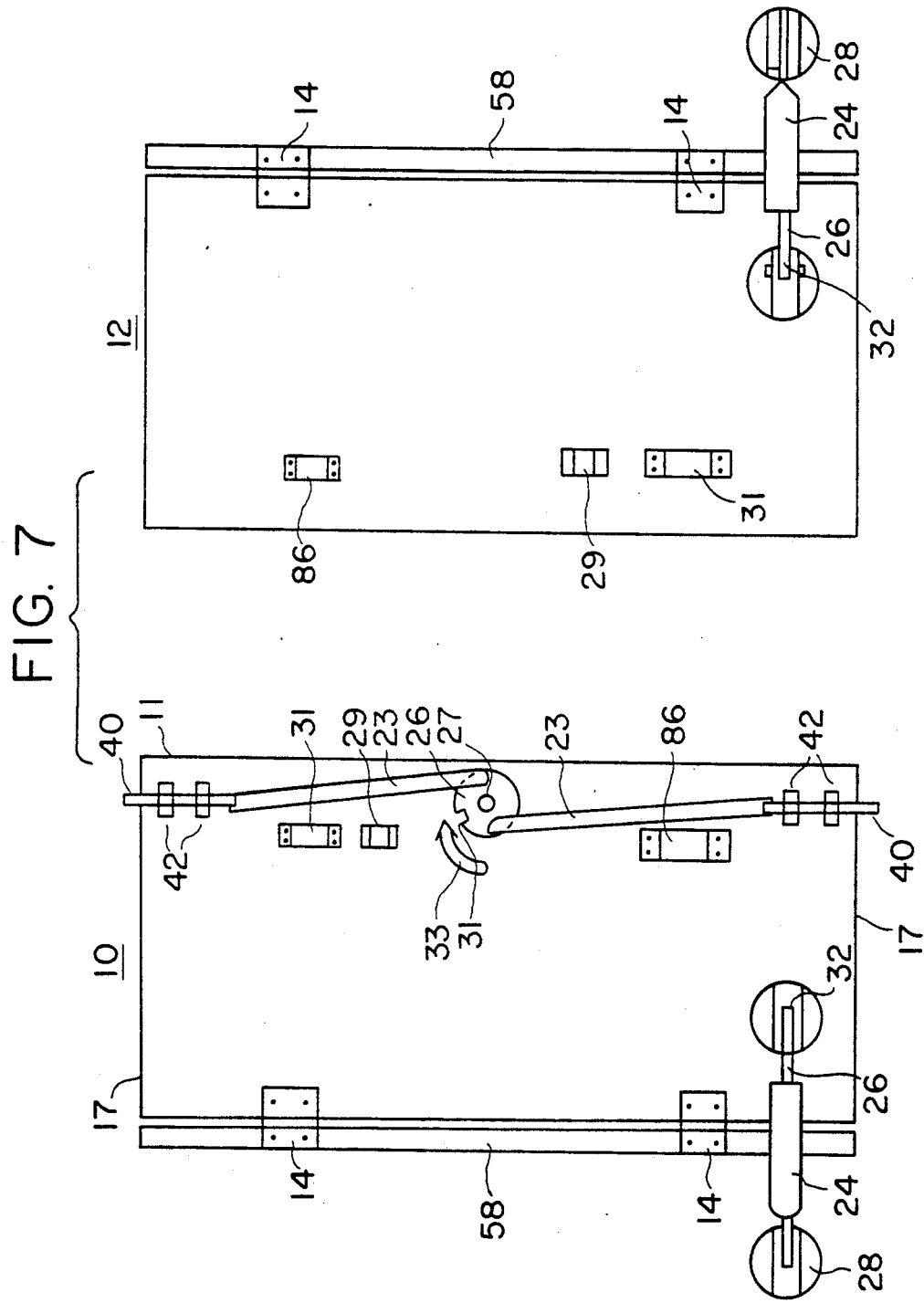

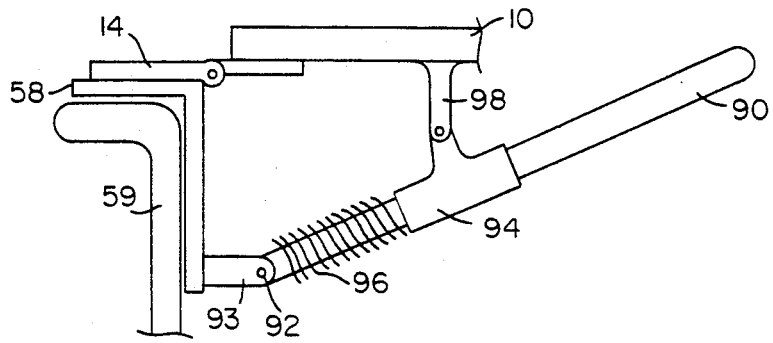
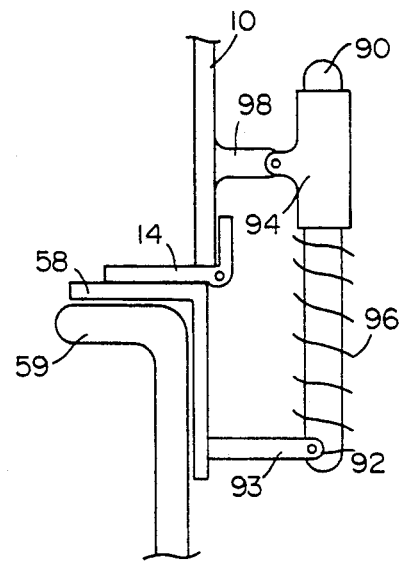
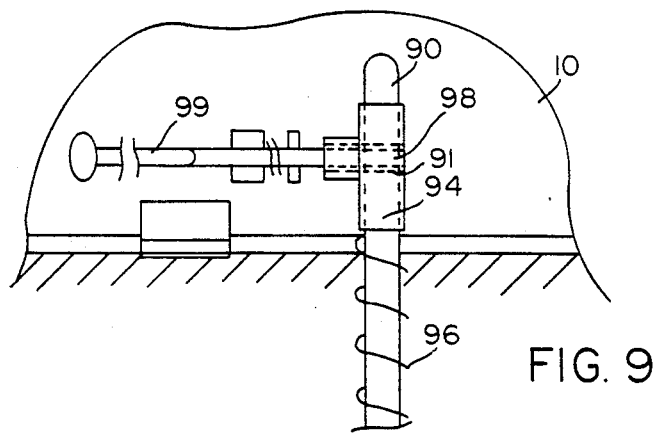
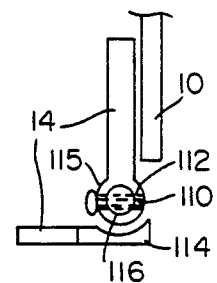
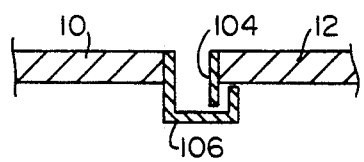
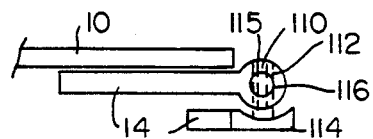

COMBINATION PIPE RACK AND TOOL LOCKER FOR A TRUCK BED

ROSS REFERENCE TO COPENDING U. S. PATENT APPLICATION

This application is a continuation-in-part of copending application Ser. No. 07/406,441 filed Sept. 13, 1989.

TECHNICAL FIELD

This invention relates to lockers and racks such as are used on the truckbeds of pickup trucks to secure tools and racks that are used to carry long lengths of pipe, lumber, etc., haul leaves, trash, etc., or secure tools.

BACKGROUND ART

The pickup truck has been adapted by many house holders and journeymen for a variety of uses. Adaptations include;

racks for carrying pipe, lumber, metal bars;

side panels for hauling loose bulky material such as leaves and trash;

large chests for carrying tools that can be locked and secured in the bed of the truck.

The adaptive equipment—the pipe rack, tool chest and the side panels—are typically heavy and awkward to install and remove. Yet the journeyman frequently needs to use his truck for any or all of these jobs.

The typical toolchest (e.g., U.S. Pat. No. 4,531,774) straddles the low side walls of the truck so that it must be removed when it is required to install side panels or pipe rack. Another problem with the typical toolchest is that it is generally built for only small tools since it must be removed frequently. Therefore large tools, such as a lawnmower or long handled shovel, cannot be stored therein.

The type of load for which a pipe rack is normally required is pipe that is longer than the bed of the truck. Since it is dangerous to carry pipe, lumber, etc., that protrudes out the back end of the truck, racks are normally built to support the load higher than the cab of the truck so that the load can extend over the cab. After the rack has been installed and has been used for its intended purpose, it is then desired to remove and store the rack in order to park the truck in a space with limited overhead clearance such as a garage or carport. Pipe racks for trucks of the prior art are large heavy rectangular frames that have a width and length comparable to the width and length of the truck bed so that installation and removal is difficult even for two men.

U.S. Pat. No. 4,284,303 to Hather discloses a pair of doors covering a truckbed in which the doors may be attached to the sidewalls by hinges having cutouts that enable the user to disengage the hinged attachment along the outside edges and hingably attach the doors along a line in the center of the truckbed where the doors meet. A support bar across the truckbed near the forward wall and the rearward wall may be installed to support the doors and for carrying boats when the doors are open. The support bars are removed when it is necessary to close the doors.

U.S. Pat. No. 4,211,448 discloses a truck frame with telescoping members to reduce required storage space.

Side panels which are an extension of the sidewalls of the truckbed are useful for transporting light bulky materials—leaves, trash, branches, etc. However the extension tend to restrict the field of vision of the driver so that he normally prefers that they be removed when not in use. Removal and storage of these extensions can be a nuisance when they are not needed.

U.S. Pat. No. 4,531,775 describes a load bearing security cover for a pickup truck having two doors, each hinged to the top edge of a sidewall or the truckbed and having a removable plank that forms an extension of the forward wall of the truck bed when the doors are open. The plank is maintained in position by sliding each end into a channel mounted on the edge of the doors. When the doors are closed, the removable plank is positioned vertically with one edge in contact with the centerline of the truckbed and parallel to the sidewalls and with the second long edge supporting the doors. While the claimed construction achieves the object of a cover to form an enclosure over the truckbed or extended sidewalls, the construction is not adapted to carry long lengths of pipe.

Both U.S. Pat. Nos. 2,551,239 to Bond and 4,531,775 to Beals disclose meeting edges with weather stripping along the meeting lines of the two doors. The problem with weather stripping used in this manner is that weather stripping material "wears" with use and time so that this construction eventually loses its effectiveness to preclude rainwater from the bed of the truck.

U.S. Pat. No. 2,551,239 to Bond discloses a cover for a truck including two doors, each one hinged along an outside edge to the sidewall. Each door is opened by applying pneumatic pressure to a cylinder connected between the floor of the truckbed and the respective door. The device requires a source of air pressure for its operation and its construction is more expensive than the lift assist of the present invention.

THE INVENTION

Objects

It is an object of this invention to provide a combination tool locker, pipe rack and side panel for carrying bulk loads.

It is also an object that the rack and sidepanel appurtenamces be collapsible and thereby avoid the many inconveniences associated with the devices and practices of the prior art.

In particular, it is a further object to provide a pipe rack for a truck that can be easily removed by one man and folded into the truck bed out of the way when desired.

It is another object to provide side panels that can be quickly lowered in order to enlarge the field of vision for the driver when they are not in use.

Still another object is to provide a locker for securing large tools such as is not typical with chests of the prior art.

Summary

Accordingly, this invention is directed toward a pair of doors that cover the truckbed of a pickup truck. Each door is hinged to the top of a sidewall of the truckbed. When the doors are horizontal, the edges of the doors opposite the hinged edges meet so as to enclose a space bounded by the tailgate and the bottom, sides and forward wall of the truckbed.

Several hinging arrangements are feasible and all are an embodiment of this invention. These include:

bolting one flange of each hinge to the upper rim of the flatbed wall;

bolting one flange of each hinge to a flatbar or angle parallel to the edge of the door and bolted to the top rim of the sidewall;

bolting the flatbar, with the door edge hingably attached, to the tops of stakes. The doors are supported in the horizontal position by resting on the topmost edges of the rear wall and forward wall of the truckbed.

When the doors are rotated on their hinges to the upright orientation, they may be fixed in this position by two racks that extend across the width of the truckbed such that one rack is positioned near the cab and the other rack is positioned near the tailgate.

In one embodiment, each rack is an H-frame having two upright bars (legs) attached by a cross bar whose length equals the width of the truckbed. One end of each H-frame is fastened to one end of the doors by slidable and hingable insertion into a closed U-bracket where it is secured by a pin through the bracket and leg. The other leg of the H-frame fits into an open U-bracket attached to the other door where it is similarly secured by a pin through the leg and bracket. In order to carry long pipe, the H-frames are slidably positioned in their brackets and a pin is inserted through the leg and bracket so that the cross bar of each H-frame is higher than the roof of the cab thereby enabling long lengths of pipe, etc., to extend over the roof of the cab.

The doors fixed in the vertical orientation also serve as side panels, i.e., extensions of the side walls of the truckbed. The overall height of the side panel is therefore equal to the height of the sidewall plus the width of the door. Hooks on the inside edge of the open doors are provided for tying down covers when the doors are up and the truck is used to carry trash, leaves, etc.

A lift assist for each door may be provided comprising a spring loaded plunger or a pneumatic or hydraulic cylinder whose one end is attached to the truckbed floor or another hinged bracket extending from the hinge angle. The lift serves two functions. One is to assist in opening the doors. The second is to support the doors in the upright position. The extended lift assist may be locked to support the doors in the open position.

The doors may be locked in the closed position by a flange attached to one door that passes through a slot in the second door when the doors are closed so that a padlock may be fastened through a hole in the flange.

In another embodiment, the doors may be locked by rotating a handle centrally located near the meeting edges of the closed doors which pushes two rods into openings in the tailgate and forward wall thereby locking the doors.

BRIEF DESCRIPTION OF THE DRAWINGS

FIG. 3 shows the H-frame racks.

FIG. 4 shows the H-frame secured to the inside of the door.

FIG. 5 shows an embodiment in which cross bars are substituted for H frames.

FIG. 6 shows one method of locking the doors.

FIG. 7 shows a second method of locking the doors.

FIG. 8A shows a spring loaded lift assist with the door closed.

FIG. 8B shows the spring loaded lift assist with the door open.

FIG. 9 shows the locking feature of the lift assist.

FIG. 10 shows the drain feature of the doors in the closed position.

FIG. 11 shows the hinge locking pin with the door open.

FIG. 12 shows the hinge locking pin with the door closed.

DESCRIPTION OF THE BEST MODE

The following detailed description details the invention by way of example and not by way of limitation of the principles of the invention. This description will clearly enable one skilled in the art to make and use the invention and describes several embodiments, adaptations, variations, alternatives and uses of the invention including what I presently believe to be the best mode for carrying out the invention.

Figure 1:
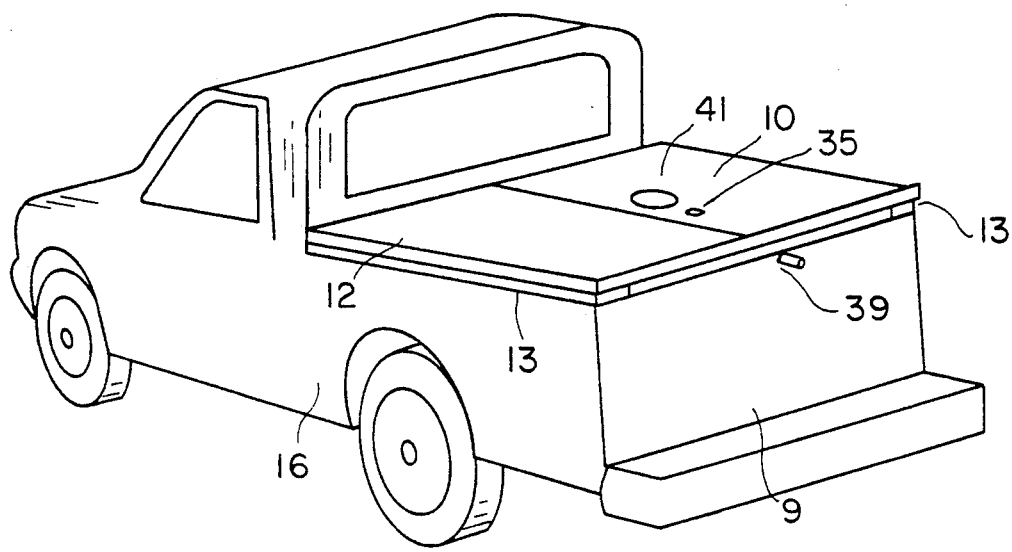
In FIG. 1 is shown a truck with the doors in the closed (horizontal position to serve as a large lockable toolchest.

In FIG. 1 are shown the doors, 10 and 12, of this invention in the closed position over the bed of the truck. The tailgate is up so that the truckbed is entirely enclosed for securing even large tools, such as shovels, etc., therein. The centrally locked door handle 41 and a keyhole are shown.

Figure 2:
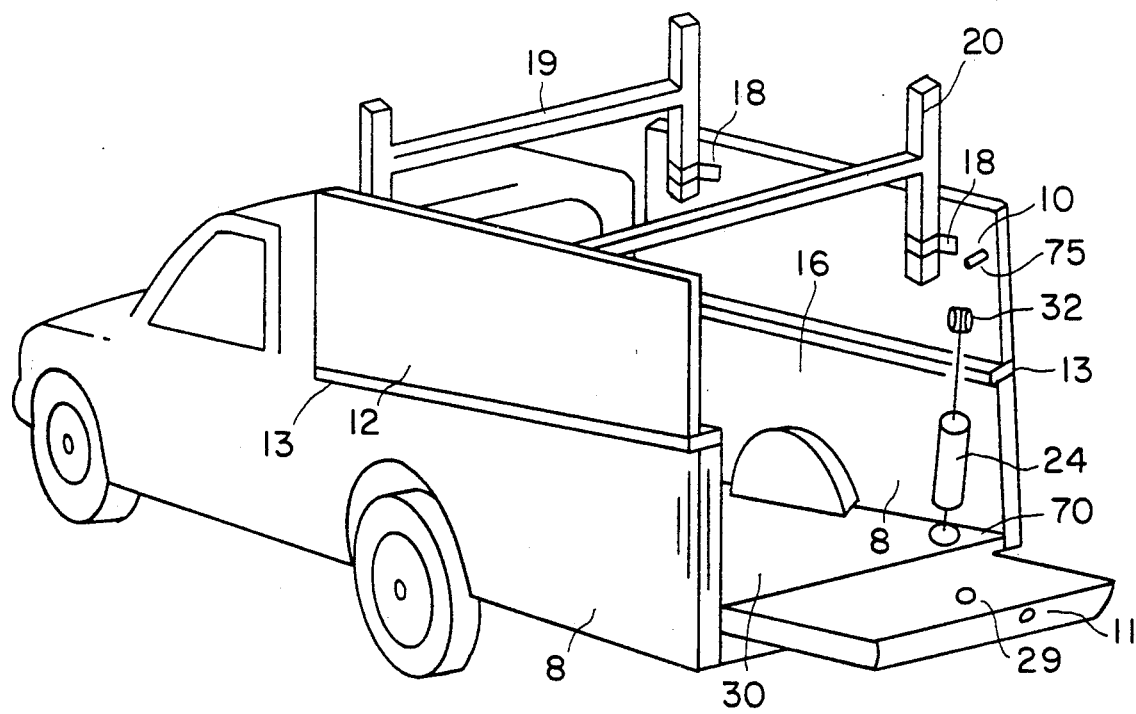
In FIG. 2 the doors are shown open with H-frames (rack) extended across the truckbed to carry long pipe extending over the cab roof or (with tailgate up) to carry bulk material (leaves, trash).

In FIG. 2, the doors, 10 and 12, are shown in the upright position and are seen to be extensions of the sidewalls of the truckbed.

The underside of door 10 or 12 is shown in FIG. 4. Each door is attached by hinges 66 and 62 to a hinging bar 58 which is then attached to the top rim of the sidewall of the truckbed 61. The hinging bar may simply be a flat bar, however, angle is sturdier and provides for the attachment of a lift assist as will be discussed in later paragraphs. As shown in FIG. 4, one plate of the angle 69 lies on the top rim of the sidewall and the other parallel plate 79 of the angle 58 extends down into the bed of the truck.

As shown in a preferred construction in FIG. 13, an open three sided frame is formed by the two angles and a third angle, that extends across the top of the frontwall. This construction provides for a more watertight fitting between the front edges of the doors and the top of the forward wall of the truckbed when the doors are closed.

According to an alternate construction (not shown) for hinging the doors to the top edge of the sidewalls, one flange of each hinge may be attached to the top of a stake that is positioned in stake holes in the top rim of the sidewall of the truck.

FIG. 11 shows an end view of a hinge 14 attached to door 10 which includes a security feature of this invention. A locking pin 110 positioned through a hole 115 in the barrel 112 of the hinge 14 and the hinge pin 116 locks the hinge pin 116 in the hinge barrel 112. The locking pin 110 can only be inserted into the barrel 112 of the hinge 14 from inside the door 10 and when the door 10 is open as shown in FIG. 11. As shown in FIG. 12, when the door 10 is shut the pin 110 is prevented by stop 114 from being driven out of its hole 112 from outside the truck. This feature prevents unauthorized access to the truckbed by an intruder who would otherwise simply remove the hinge pins and take the doors off the truckbed. It is obvious that this security measure may be used with any of the constructions for hinging the doors to the sidewalls that are discussed in foregoing paragraphs.

FIGS. 2 and 3 show two H-frames, 19 and 20, which straddle the truckbed and have an end attached to each door. The two H-frames comprise two legs 21 connected by a cross bar 22. When the H-frames are supporting the doors in the upright position, the upright legs of the H-frames are long enough so that the cross bars 22 may be supported above the roof of the cab. The H-configuration of each frame ensures that lengths of pipe are supported by the cross bars and nested securely between the upright legs.

Either one of several embodiments may be used to attach the H-frame to the doors. One construction is shown in FIG. 4. The inside of the each door has a hinging bracket 44, a storage catch 47, and a support catch 52. Each hinging bracket is a closed U strap into which a leg of the H-frame is slidably and hingably inserted.

The H-frame is shown made of round tube in FIG. 4.

In order to close the doors, each H-frame is slid to a lowered position in its U bracket as shown in FIG. 4. The free end of the H-frame is secured against the door by pin 53 through the leg 46 and the open U storage bracket 47. Alternatively, each H frame may be lifted out of its hinging bracket and stored in a separate area.

When the doors are opened in order to carry pipe, the H-frame has been slid up in its hinging bracket and turned across the truck bed so that the free end 46 is now secured to the support catch 52 in the opposite door by a pin through hole 54 in leg 46 and support bracket 52. On the other end of the H-frame, pin 49 is inserted through the hinging bracket 44 and hole 50 in leg 21 to maintain the H-frame in an elevated position to support long pipe over the roof of the cab.

FIG. 5 shows another embodiment for supporting the doors in the open position that is useful when it is not intended to carry long pipe that would otherwise extend over the roof of the cab. A cross bar 25 is shown in place of the H-frame. One end 27 of the cross bar 25 is hingably attached to open bracket 86 with pin 80 through hole 82 and the end 27 of the cross bar. When the doors are to be closed, the free end 29 of the cross bar 25 is swung against the inside of the door 10 and retained by pin 84 through open bracket 86 and the cross bar 25. When the doors are to be opened, the end of the cross bar is swung across the bed of the cab and secured to open support bracket 31 by a pin 33.

For some situations where a transported item on the floor of the truckbed is higher than the cross bar, it may be convenient to construct the hinge to the cross bar as a universal joint so that the cross bar can be swung up and over the item when required. This is accomplished by rotatably securing the open U strap 86 to the door 10 by a single pin (not shown in FIG. 5) which fastens the connecting leg of the open U bracket 86 to the door 10. The support bar thereby has two rotational degrees of freedom which provides the universal character to the joint.

FIG. 8A and 8B are end views of a spring loaded lift assist of this invention which has advantage over the pneumatic lift assists described in the prior art. One advantage is that the lift assist is constructed to provide a force in lifting the door which is substantially balanced by the weight of the door over the entire range of orientation of the door. This feature is illustrated by comparing FIG. 8A showing the door in the closed position to FIG. 8B showing the door in the open position.

FIG. 8A and 8B show the end view of the door 10, attached by hinge 14 to the sidewall frame 58 on top of sidewall 59. The lower end 92 of lift rod 90 is hingably attached to a bracket 93 extending from the sidewall frame 58. The upper end of lift rod 90 passes slidably through a spring 96 and lift sleeve 94. Lift sleeve 94 is hingably attached to bracket 98 which is rigidly attached to the inside of the door 10. As the door is moved from the fully vertical orientation (FIG. 8B) to the horizontal orientation (FIG. 8A, spring 96 is compressed so as to resist closing the door. The force constant of the spring and the location of joint 92 with respect to hinge 14 is selected to provide a moment which is;

substantially equal and opppsite to the moment exerted by the weight of the door when the door is closed, slightly smaller than the moment of the weight of the door about its hinge when the door is midway between vertical and horizontal;

equal and opposite to the moment exerted by the weight of the door when the door is vertical.

This arrangement provides for greatest convenience in utilizing the lift assist.

While I do not wish to be bound by theory, the interaction of spring force opposed to weight of the door to provide this desirable load characteristic may be explained as follows:

The moment due to the weight of the door can be shown to be approximately proportional to $\cos \theta$ where $\theta$ is the angle of inclination of the door so that the maximum lifting force (if there were no lift assist) occurs when $\theta = 0$. (i.e., the door is closed.)

As the door is closed, the spring is compressed and the force of the spring 96 exerts a moment about hinge 14 which opposes the moment exerted by the weight of the door. The moment of the compressed force by the spring exerted about hinge 14 can be shown by well known mathematical principles to be approximately proportional to the vertical distance of hinge point 92 below hinge point 14 multiplied by $\cos(b\theta + a)$ where the constant, angle a, is illustrated in FIG. 8A. The force of compression is also approximately proportional to $\cos(b\theta + a)$. (b is a constant introduced because the lift assist rod does not exactly coincide with the surface of the door.) Therefore, when the force constant and the position of the lower end of the lift rod are appropriately selected, the resultant force required to lift the door is substantially proportional to:

$$A \cos \theta - B \cos^2(b\theta + a)$$

where A, B, b and a are constants which depend on the spring constant, the length of the spring and the location of the door hinge with respect to the location of the hingable attachment of the lift rod to the sidewall.

This function of $\theta$ has a value of 0 when $\theta = 0$ (the doors are closed) and when $\theta = \pi/2$ (the doors are open.) Between $\theta = 0$ and $\theta = \pi/2$, the function has a value much closer to 0 than if there were no lift assist Therefore the lift assist makes the door easy to open (at $\theta = 0$) but allows just enough closing force between opening and closing to prevent the door from flying open in the event the door should become unlocked for any reason when in the closed position.

Yet another feature of the spring loaded lift assist is the locking arrangement not shown in FIG. 8 but illustrated in the FIG. 9 which is a plan view of the lift assist. There is shown the door 10 (cutaway) hinged at location 14 to sidewall frame 58 (cutaway). There is also shown the lift assist including the spring 96 on lift rod 90 which passes through lift sleeve 94.

A spring loaded locking pin 98 is slidably attached perpendicularly to the sleeve 94. A lock hole 91 is located in the lift rod 90 so that the door 10 is completely opened, the pin 98 snaps into the lock hole and secures the door 10 in the vertical position. The lock pin is an extension of tie rod 99. When it is desired to close the door, the user simply pulls on the tie rod 99 to retract the pin 98. The tie rod 99 is conveniently located so that the user can stand on the ground at the end of the truck to retract the lock pin 98 without having to climb into the truckbed.

A means for attaching the lower end of a lift assist is shown in FIG. 4. The lift assist 24 shown in FIG. 4 is a pneumatic or hydraulic cylinder however it will be understood that item 24 could also be the spring lift assist of FIG. 8. An arm 64 has one end 65 attached to the hinging bar 58 and extends down into the bed of the truck. The lower end 67 of the arm has an open U bracket 68 to which the lower end 70 of the lift assist 24 is hingably attached. The other end 74 of the cylinder 24 is shown hingably attached to the underside of the door 10. This arrangement provides that the length of the arm together with the force constant selected for item 24 can be selected to present a zero load to lifting the doors as discussed in the foregoing paragraphs.

An alternate means of supporting the lower end of the lift assist is to bolt it to the floor of the truckbed as shown in FIG. 2. However this construction does not provide the advantage of selecting the location for attaching the lift assist to provide zero load as does the construction of FIG. 4.

The doors may be locked in the closed position using one of several constructions.

FIG. 6 shows one construction in which one door 12 (shown cut away) has an ear 5 attached to its outside near the meeting edge. The other door has a slot 3 through which the ear 5 passes when the doors are closed. A padlock through the hole 2 in the ear 5 locks the doors in the closed position.

A second construction for locking the doors is shown in FIG. 7. One door has a latch mechanism comprising two rods passing through eye-flanges 42 so as to slide parallel and adjacent to a meeting edge 11 of the door 10. The rods 40 have ends hingably attached by drive straps 23 to the edge of a cam plate 26 having a central shaft 27 rotatably mounted on the door 10. When the cam plate 26 is rotated by turning the handle 41 (not shown in FIG. 7 but shown in FIG. 1) each rod 40 slides so that the locking end of one rod protrudes into a hole in the forward wall and rod 40 protrudes into a hole in the rear wall (not shown). When the doors are closed., an edge of door 10 lies over the adjacent meeting edge of door 12 so that when the handle is turned, the doors are locked. A key may now be inserted into a key hole, 35 in FIG. 1, and turned to rotate a latch 31 in FIG. 7 into a notch 33 in the plate 26 so that both doors are locked.

Referring to FIG. 2 and 7, when the doors and tailgate are closed, a stud 75 having one end attached to door 12 passes into a hole 77 in the top edge surface of the tailgate, thereby securing the tailgate.

As shown in FIG. 5, hooks may be installed at appropriate locations on the inside of the doors which serve as tie downs for ropes, etc., for the situation when the truck is to be used to haul bulk (leaves, trash, etc.) and it is necessary to secure a cover over the truckbed to prevent the contents from blowing away.

In order to prevent rain water from seeping into the truck bed when the doors are closed, a drain construction at the meeting edges of the doors is provided as shown in the cross sectional view of FIG. 10. There is shown the meeting edges of doors 10 and 12. A gutter 106 extends from the edge of door 10 which mates with a lip 104 extending from the edge of door 12. Water draining from the top side of doors 10 and 12 will be caught in the gutter 106 and drain off the end of the truckbed.

This invention is for an apparatus that can be adapted to a number of purposes—carrying pipe, storing large tools, carrying bulky materials, etc. Several structural designs including a design for supporting the pipe that is longer than the truckbed and supporting and locking the doors and tailgate in a closed position are presented which accomplish these objectives. Several features of this invention provide advantages over other apparatus of the prior art such as a gutter between the doors oriented to the horizontal position that prevents rain from entering the truckbed. Another feature is a lift assist that may be locked to add further support to the doors oriented in the vertical position. The lift assist may be unlocked conveniently while standing on the ground at the tail end of the truckbed. A design of the lift assist is presented which minimizes the amount of effort required to open the door.

It should be understood that various modifications within the scope of this invention can be made by one of ordinary skill in the art without departing from the spirit thereof after studying the drawings and reading the specification. I therefore wish may invention to be defined by the scope of the appended claims as broadly as the prior art will permit and in view of the specification if need be.

I claim:

1. A combination pipe rack and tool locker to be mounted on a truckbed of a truck having a floor with a length and breadth, parallel first and second sidewalls having said length, a frontwall and a rearwall wherein said walls have a common height defined by top edges of each wall and wherein said rack and locker combination comprises:

a first door and a second door, each having a length equal to said length of said truckbed and a width that is substantially equal to one half said width of said truck bed and each having an inside and an outside bounded by a hinging edge parallel to a meeting edge;

a first and second means for hingably attaching respectively said first and second hinging edges of said doors to said first and second top edges of said sidewalls permitting said doors turning on said door hinging means to be oriented vertically to an open position as parallel extensions of said sidewalls and oriented horizontally over said truckbed to form an enclosure with said truckbed;

a first means for racking said pipe located close to said frontwall and having a hinged end and a supported end;

a second means for racking said pipe located close to said rear wall and having a hinged end and a supported end;

a first and second means for hingably attaching, respectively, said hinging ends of said first and second racking means to said insides of said first and second doors providing for said racking means to be oriented against said inside of said first and second door when said doors are oriented horizontally to form said enclosure and providing for said racking means to be oriented across said truckbed to support pipe when said doors are oriented vertically;

a first and second means for detachably securing said supported ends of said first and second racking means to said second and first door respectively to carry pipe and provide rigid support to maintain said doors in said vertical position and permit folding said first and second racking means against said inside of said first and second door respectively when said doors are oriented to said horizontal position.

2. A rack and locker combination as in claim 1 wherein each said racking means comprises:
a cross bar having two ends;
a pair of leg bars, one leg bar perpendicularly secured to one said cross bar end and parallel to said other leg bar secured to said other cross bar end; and each said hingably attaching means comprises:
a U strap bracket with a flange on each of two ends that are fastened to said door forming a closed loop with said door;
each said detachably securing means comprising an open U strap bracket including two legs connected by a connecting leg attached to said door to form an open loop whereby said leg bar may be detachably secured by a pin through said leg bar and said open U strap bracket.

3. A rack and locker combination as in claim 2 wherein said truck has a cab and said cross bar is supported above said cab when said leg is secured in said second location.

4. A rack and locker combination as in claim 1 wherein:
each said racking means comprises a cross bar whose hinging ends and supporting ends each have a hole;
said rack hinging means comprises a U strap bracket having two parallel legs each with a hole in one end and each connected to one another at their other ends by a center section which is attached to said door to form an open loop;
said hinging end of said leg secured between said U bracket legs by a pin through said holes of said U bracket and said hinging end thereby permitting said cross bar to be oriented against said door and secured when said doors are closed and oriented across said truckbed with each said support end secured to said other door to support said pipe when said doors are open to said oriented position.

5. A combination pipe rack and tool locker as in claim 4 wherein said center section is rotatably attached to said door by a pin through said center section and said door thereby providing a universal joint for said hinged end of said crossbar attached to said door.

6. A rack and locker combination as in claim 1 wherein said door hinging means further comprises:
a flat bar parallel to and attachable to said top edge of said sidewall;
at least one hinge with a first flange attached to said bar and a second flange attached to said door;

7. A rack and locker combination as in claim 1 wherein said door hinging means further comprises:
an elongated angle including two bars joined perpendicularly to one another along a common elongated edge;
at least one hinge with a flange attached to one of said bars and a second flange attached to said door;
said angle positioned with said angle bar having said attached hinge parallel to and on top of said top edge of said side wall and said other angle bar inside said truckbed.

8. A rack and locker combination as in claim 1 which further comprises:
a lift assist cylinder for at least one door and having one end attached to said door and the other end attached to a floor of said truckbed.

9. A rack and locker combination as in claim 1 which further comprises:
an extension member having one end attached to said door hinging means and another end extending into said truck bed;
a lift assist cylinder having one end attached to said door and another end attached to said extending end.

10. A rack and locker means as in claim 1 which further comprises a means for locking said doors in said closed position.

11. A rack and locker combination as in claim 10 wherein said front and rear walls of said truckbed each have a hole and wherein said locking means further comprises:
front and rear pairs of eye flanges attached to said inside of said first door, each having a hole with a common centerline parallel and near to said meeting line and each pair located respectively near said front top edge and said rear top edge;
a front and rear rod, each having a first and a second end and located respectively through said holes of said front and rear flanges;
a plate having a center shaft rotatably mounted on said inside of said first door and protruding through said first door near said meeting edge and adjacent to said first end of each said rod;
a handle means attached to said shaft on said outside of said door;
a front and rear drive strap each having an end attached to said plate and each having an end attached respectively to said front and rear rods.
said front and rear rods sliding in said eyeflanges forcing said second ends of said front and rear rods to pass respectively into said holes in said front and rear walls when said doors are oriented into said horizontal position when said handle is turned to a locking position thereby locking said doors when said first door is on top of said second door.

12. A rack and locker combination as in claim 10 wherein said locking means further comprises:
a slot in said first door;
a flange with a hole attached to said outside of said second door;
said flange protruding through said slot when said doors are oriented to the closed position with said first door overlapping said second door and thereby locking said doors in said first closed position when a padlock is passed through said hole in said flange.

13. A rack and locker combination as in claim 1 which further comprises at least one hook secured to said insides of said door to serve as anchors for tying covers over said truck bed when said doors are oriented to said open position.

14. A rack and locker combination as in claim 10 wherein said locking means further comprises:
at least one hole in a top side of said tailgate;
at least one stud attached to a side of said doors which face said top side when said tailgate and doors are in a closed position;
said studs being inserted into said holes when said doors and tailgate are in said closed position.

15. A combination pipe rack and tool holder as in claim 1 which further comprises:
a gutter channel including two elongated sides and a bottom member connecting two said sides to form said gutter channel wherein one said side has an edge joined to and along said meeting edge of said first door with said gutter channel oriented to receive rainwater running off said first door when said first door is oriented in said closed position;
an elongated lip attached to and along said meeting edge of said second door and arranged to extend into said gutter channel when said doors are in said closed position thereby providing that rainwater will drain off said second door, onto said lip and thence into said gutter channel when said doors are oriented in said closed position.

16. A combination pipe rack and tool locker as in claim 1 which further comprises a first and a second spring loaded lift assist for said first and second doors respectively wherein each lift assist includes:
a lift rod having a first and a second rod end;
means for hingably attaching said first rod end to said sidewall at a first location;
a sleeve hingably attached to said inside of said respective door at a second location and through which said lift rod is slidably positioned.
a spring, having a length and spring constant, slidably positioned on said rod between said hinged end and said sleeve;
said first and second locations and said spring constant and said length of spring operably selected to provide that when said door is oriented vertically or horizontally, substantially no force is required to rotate the door and when the door is positioned at an orientation intermediate between vertical and horizontal, substantially less force than the weight of the door is required to lift the door;
a spring loaded stop pin slidably mounted on said sleeve;
said lift rod having a hole in its side;
a handle attached to said stop pin;
said stop pin and said hole operably positioned to provide that when said door is oriented to said vertical orientation, said stop pin snaps into said hole thereby locking said lift rod in position to support said door in said fixed vertical orientation and permitting said stop pin to be withdrawn from said hole when it is required to release said door from said vertical orientation.

17. A combination pipe rack and tool locker as in claim 1 wherein said hingably attaching means comprises:
a first hinge flange attached to a respective one of said doors;
a second hinge flange having means for attachment to said respective sidewall;
a hinge barrel means attached to said first and second flanges;
a hinge pin slidably positioned in said hinge barrel means thereby rotably joining said flanges;
said hinge pin having a hole passing perpendicularly through its side;
said barrel means having a hole in its side that may be aligned with said hole in said hinge pin;
a knockout pin positioned in said hole thereby preventing said hinge pin from being removed from said hinge barrels;
a stop attached to said second flange;
said stop operably positioned with respect to said knockout pin in said hole to permit that when said door is oriented vertically, said knockout pin may be pushed out of said hole and when said door is oriented horizontally, said stop prevents said knockout pin from being pushed out of said hole thereby preventing unauthorized removal of said door when said door is closed.

* * * * *